United States Patent
Mottin et al.

(10) Patent No.: US 11,141,793 B2
(45) Date of Patent: Oct. 12, 2021

(54) DEVICE AND A METHOD FOR FABRICATING A THREE-DIMENSIONAL PART BY SELECTIVELY MELTING A POWDER BED

(71) Applicant: SAFRAN AIRCRAFT ENGINES, Paris (FR)

(72) Inventors: Jean-Baptiste Mottin, Moissy-Cramayel (FR); Guillaume Fribourg, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 338 days.

(21) Appl. No.: 16/062,548

(22) PCT Filed: Dec. 9, 2016

(86) PCT No.: PCT/FR2016/053305
§ 371 (c)(1),
(2) Date: Jun. 14, 2018

(87) PCT Pub. No.: WO2017/103392
PCT Pub. Date: Jun. 22, 2017

(65) Prior Publication Data
US 2018/0369917 A1 Dec. 27, 2018

(30) Foreign Application Priority Data
Dec. 14, 2015 (FR) ........................................ 1562291

(51) Int. Cl.
*B29C 64/153* (2017.01)
*B22F 12/00* (2021.01)
(Continued)

(52) U.S. Cl.
CPC .............. *B22F 12/00* (2021.01); *B22F 3/003* (2013.01); *B22F 5/04* (2013.01); *B22F 7/06* (2013.01);
(Continued)

(58) Field of Classification Search
CPC .......... B22F 3/1055; B22F 3/003; B22F 5/04; B22F 7/06; B33Y 10/00; B33Y 30/00; B33Y 40/00; B29C 64/153
See application file for complete search history.

(56) References Cited

U.S. PATENT DOCUMENTS

2006/0214335 A1*  9/2006  Cox ........................ B01F 3/188
                                                    264/497
2016/0074938 A1*  3/2016  Kitani .................... B23K 13/01
                                                    419/7

FOREIGN PATENT DOCUMENTS

CN         104001917 A    8/2014
DE    10 2012 014839 A1   1/2014
(Continued)

OTHER PUBLICATIONS

International Search Report as issued in International Patent Application No. PCT/FR2016/053305, dated Apr. 10, 2017.

*Primary Examiner* — Joseph S Del Sole
*Assistant Examiner* — John Robitaille
(74) *Attorney, Agent, or Firm* — Pillsbury Winthrop Shaw Pitman LLP

(57) ABSTRACT

A device for fabricating a three-dimensional part by selectively melting a powder bed, the device including a first tank for containing a first powder and provided with a first powder dispenser valve, a second tank for containing a second different powder and provided with a second powder dispenser valve, a first and a second monitoring device for monitoring the quantity of first powder delivered by the first valve and the quantity of second powder delivered by the (Continued)

second valve, a mixer chamber in communication with the first and second valves and including a third powder dispenser valve, and a mixer for mixing the powder particles in the chamber, a support for receiving the powder delivered by the third valve and on which the parts is to be fabricated, a powder spreader for spreading powder on the support, and a heater member for locally melting the powder spread on the support.

13 Claims, 5 Drawing Sheets

(51) Int. Cl.
| | | |
|---|---|---|
| *B22F 5/04* | (2006.01) | |
| *B22F 7/06* | (2006.01) | |
| *B33Y 30/00* | (2015.01) | |
| *B33Y 10/00* | (2015.01) | |
| *B33Y 40/00* | (2020.01) | |
| *B22F 3/00* | (2021.01) | |
| *B22F 10/10* | (2021.01) | |

(52) U.S. Cl.
CPC ............ *B29C 64/153* (2017.08); *B33Y 10/00* (2014.12); *B33Y 30/00* (2014.12); *B33Y 40/00* (2014.12); *B22F 10/10* (2021.01); *B22F 2203/15* (2013.01); *B22F 2207/01* (2013.01); *B22F 2301/15* (2013.01); *B22F 2303/405* (2013.01); *B22F 2998/10* (2013.01); *B22F 2999/00* (2013.01); *Y02P 10/25* (2015.11)

(56) References Cited

FOREIGN PATENT DOCUMENTS

| | | |
|---|---|---|
| EP | 1 700 686 A2 | 9/2006 |
| WO | WO 2014/188778 A1 | 11/2014 |

\* cited by examiner

DEVICE AND A METHOD FOR FABRICATING A THREE-DIMENSIONAL PART BY SELECTIVELY MELTING A POWDER BED

CROSS REFERENCE TO RELATED APPLICATIONS

This application is the U.S. National Stage of PCT/FR2016/053305 filed Dec. 9, 2016, which in turn claims priority to French Application No. 1562291, filed Dec. 14, 2015. The contents of both applications are incorporated herein by reference in their entirety.

BACKGROUND OF THE INVENTION

The present invention relates to the general field of making parts by additive fabrication. The invention applies more particularly to methods of fabricating three-dimensional parts having a property gradient by selectively melting a powder bed.

Parts having a property gradient are parts that have portions with different properties, for example different materials, different grain structures, etc.

More and more effort is going into fabricating parts that present varying properties, in particular in order to optimize their weight and/or reliability. For example, a suitable material may be selected for each portion of the part, as a function of the environmental and thermomechanical stresses to which the portion is to be subjected. Thus, the reliability of a part can be improved by optimizing the properties of each of its portions, and in certain circumstances it is possible to reduce its overall weight by selecting lighter materials for those portions where that is possible.

Such a reduction in the weight of parts is desirable in the field of aviation, where current issues relate specifically to reducing the onboard weight in turbine engines, in order to reduce fuel consumption.

Nevertheless, such a part is generally difficult to fabricate. For example, means for fabricating traditional parts out of metal or metal alloy, such as casting or machining, do not generally enable such parts to be made. When it is desired to fabricate a part with a property gradient, it is common practice to subdivide the part into sub-parts presenting different properties, and then to bond or braze them together. Such techniques are lengthy and expensive.

The devices used for fabricating parts by additive fabrication, e.g. by selectively melting a powder bed (of the selective laser melting or electron beam melting type) make it simpler to obtain complex three-dimensional parts as a single piece, and at lower cost compared with the above-mentioned traditional methods. At present, those devices and the associated fabrication methods do not make it possible to fabricate parts having a property gradient.

OBJECT AND SUMMARY OF THE INVENTION

A main object of the present invention is thus to enable parts having a property gradient to be fabricated by additive fabrication, and more particularly by selectively melting a powder bed, in particular for the purpose of obtaining a better relationship between the reliability of the part and its weight.

This object is achieved by a device for fabricating a three-dimensional part by selectively melting a powder bed, the device comprising:

- a first tank for containing a first powder, said tank being provided with a first powder dispenser valve;
- at least one second tank for containing a second powder different from the first powder, said tank being provided with a second powder dispenser valve;
- monitor means for monitoring the quantity of first powder delivered by the first valve;
- monitor means for monitoring the quantity of second powder delivered by the second valve;
- a mixer chamber in communication with the first and second valves, said chamber including a third powder dispenser valve, and means for mixing the powder particles contained in said chamber;
- a support for receiving the powder delivered by the third valve and on which the part is to be fabricated;
- powder spreader means for spreading powder on the support; and
- a heater member for locally melting the powder spread on the support.

The device of the invention is advantageous in that it makes it possible to fabricate a part as a single piece that presents portions with properties that may be different, while also ensuring between those portions a transition in the form of a property gradient.

In known manner, the part is fabricated by stacking successive bonded-together layers of selectively melted powder. The device of the invention makes it possible to vary the composition of each layer progressively during fabrication of the part. Specifically, it is possible to fill the tanks with two powders that are different, e.g. two powders comprising materials that are different or a single identical material but with grain sizes that are different, and, for each layer, selecting the proportion of each powder that is to be present in that layer. It is thus possible to increase the reliability of the part by ensuring a property transition in the form of a composition gradient between the various portions of the part, which gradient is made in the direction in which the part is fabricated. In addition, it is also possible to optimize the weight of the resulting part by selecting the best material or the best grain size appropriate for each portion, as a function of the stresses to which the part is to be subjected in operation.

The tanks are provided with powder dispenser valves and the device has monitor means for monitoring the quantities of powder that they deliver. It is thus possible for example to use a controller to servo-control the powder dispenser valves so as to obtain a determined quantity of powder in the mixer chamber and so as to provide accurate monitoring of the composition of each layer on the support that is to be melted by the heater member.

The device of the invention is also remarkable in that it makes it possible to mix the powders in the mixer chamber before depositing them, thereby ensuring that the powder that is deposited is homogeneous.

In an embodiment, the device may have a first powder in the first tank and a second powder in the second tank, the first and second powders being made of the same material and presenting grain sizes that are different. The term "grain sizes that are different" means for example that the $d_{50}$ or $d_{90}$ sizes of the particles of the first and second powders are different. Naturally, it is possible to use other expressions for characterizing the grain size of a powder.

In an embodiment, the device may have a first powder in the first tank and a second powder in the second tank, the first and second powders being made of materials that are different and presenting grain sizes that are identical.

In an embodiment, the device has a first powder in the first tank and a second powder in the second tank, the first and second powders being made of materials that are different and presenting grain sizes that are different.

In an embodiment, the device may have a first powder in the first tank and a second powder in the second tank, the first and second powders being made of materials that are different and presenting grain sizes that are different.

In an embodiment, when the device has a first powder in the first tank and a second powder in the second tank, the first and second powders being made of materials that are different, the first and second materials may be chemically compatible. The term "chemically compatible" is used to mean that the materials do not react chemically with each other in order to form some other chemical species, in particular during the fabrication method and when they are heated and melted by the heater member.

In an embodiment, when the device has a first powder in the first tank and a second powder in the second tank, the first and second powders being constituted by materials that are different, the first powder may be constituted by a metal alloy and the second powder may be constituted by a pure metal. The term "pure metal" is used to mean a metal comprising a single metallic element, i.e. specifically that is not an alloy between two metallic elements.

Preferably, the device further comprises monitor means for monitoring the quantity of powder or powder mixture delivered by the third valve.

The monitor means may comprise scales for weighing the powder.

In an embodiment, the device may further comprise a servo-control system for controlling at least one valve for dispensing powder or a powder mixture as a function of the quantity of powder or powder mixture delivered by said at least one valve.

Likewise preferably, the means for mixing the powder particles contained in the mixer chamber comprise an inlet orifice and an outlet orifice for a gas stream inside the mixer chamber, said gas stream inlet and outlet orifices being configured to cause a gas to flow in the mixer chamber so as to mix the powder contained in said chamber. In addition, the gas outlet may include means for preventing the powder present in the mixer chamber from escaping from said chamber.

Under such circumstances, the outlet orifice may have a protective cover configured to prevent powder from escaping from the mixer chamber via said outlet orifice.

The means for mixing powder particles contained in the mixer chamber may comprise a mixer or an agitator.

Also preferably, a powder dispenser valve is driven by a piezoelectric actuator or a hydraulic actuator. In addition, the powder dispenser valve may be servo-controlled using the means for monitoring the quantity of powder delivered by said valve.

The powder spreader means may comprise a roller or a scraper.

The heater member may comprise a laser or an electron beam generator.

In an embodiment, the first and second powder tanks may be situated above the mixer chamber.

In an embodiment, the first tank, the second tank, and the mixer chamber are stationary.

As a variant, in an embodiment, the mixer chamber may be movable and configured to recover powder in succession from one of the first and second tanks, and then from the other of the first and second tanks.

The invention also provides a method of fabricating a three-dimensional part by selectively melting a powder bed, the part comprising a successive stack of layers, the method comprising the following steps for fabricating one layer:

a) delivering a monitored quantity of a first powder from a first tank;

b) delivering a second monitored quantity of a second powder different from the first from a second tank;

c) mixing the first and second powders as delivered in steps a) and b);

d) depositing a layer of the mixer of the first and second powders obtained in step c); and e) melting at least a portion of the layer of powder deposited in step d).

As mentioned above with reference to the device of the invention, the method of the invention is remarkable in particular in that the first and second powders as delivered are mixed before being deposited. This makes it possible in particular to obtain a deposited powder layer that is homogeneous, and to make layers having a mixture of a plurality of powders. In the method of the invention, the first powder is different from the second. The term "different" is used to mean that they may comprise materials that are different or grain sizes that are different, e.g. two powders may comprise the same material but with different grain sizes, or may comprise different materials but with grain sizes that are identical, or indeed may comprise materials and grain sizes that are both different. In addition, the quantities of the first powder and of the second powder as delivered from the tanks are monitored, e.g. using monitor means such as scales, thus making it possible to obtain accurate composition gradients.

The monitored quantity of the first powder and/or the monitored quantity of the second powder may vary between two successive layers.

Finally, the invention provides a method as described above in which the part to be fabricated is a part for aviation. The term "part for aviation" is used to mean a part suitable for use in a turbojet for propelling an aircraft, e.g.: an aeroengine blade; turbine ring sectors; a turbine disk; an injector system for an aviation combustion chamber; a component of an aviation injection system; a flange; a clamping system; an engine equipment support; a cover; etc.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

Figure 1:
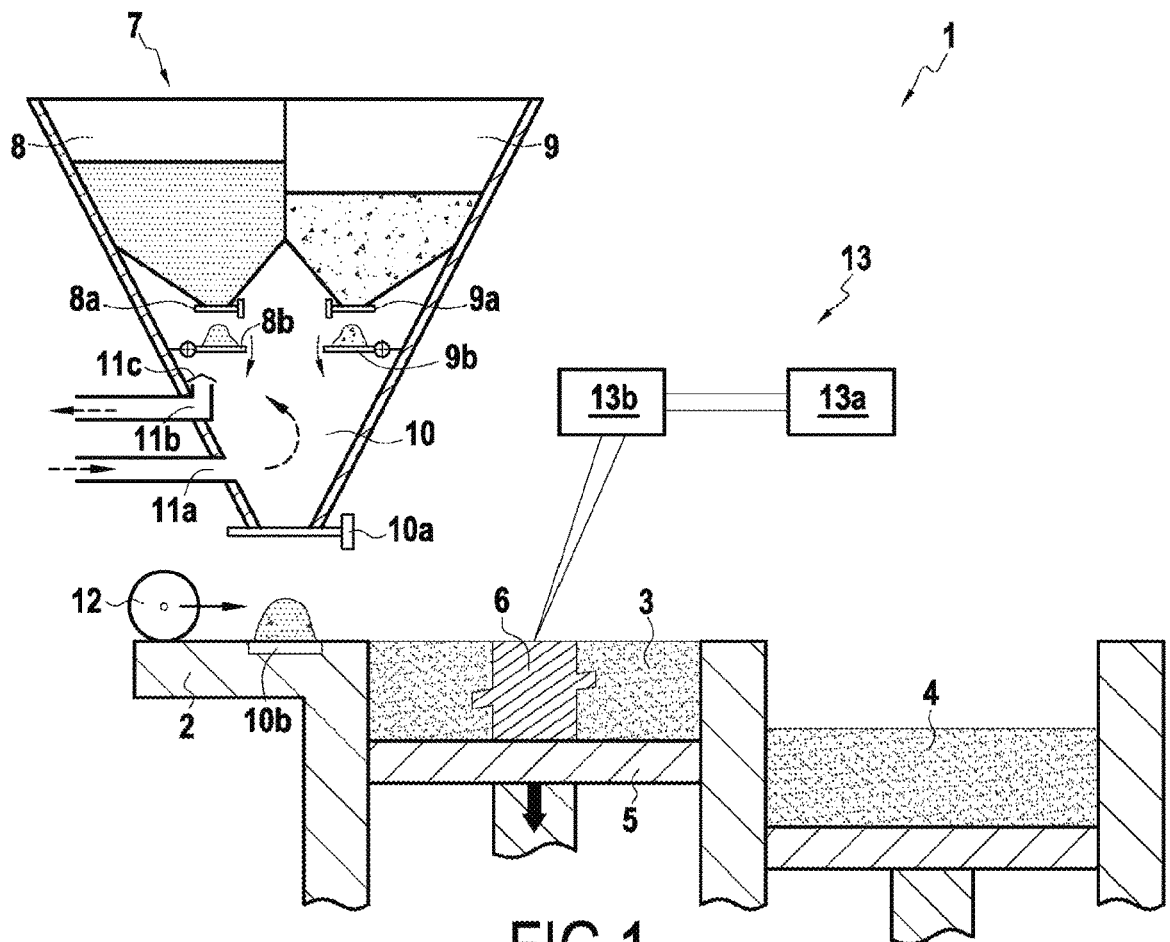
FIG. 1 is a diagrammatic section view of a device in an embodiment of the invention.

An embodiment of the invention is described below with reference to FIG. 1. Such a device serves to fabricate a part with a property gradient by selectively melting a powder bed.

The device 1 comprises firstly a structure, part of which is a stationary platen 2, another part of which comprises a fabrication zone 3 situated beside the stationary platen 2 in which the part is to be fabricated, and a powder recovery tank 4 situated on the side of the fabrication zone 3 that is remote from the stationary platen 2.

The fabrication zone 3 has a movable support 5 for receiving powder and on which a part 6 is to be fabricated. In this example, the support 5 is in the form of a platen suitable for moving vertically progressively as the part 6 is fabricated. By way of example, the support 5 may be mounted on a hydraulic actuator. Before beginning to fabricate a part, the top surfaces of the stationary platen 2 and of the support 5 are in horizontal alignment.

The device 1 also has a powder dispenser member 7 having arranged therein first and second powder tanks 8 and 9. In general manner, the first tank 8 contains a first powder, and the second tank 9 contains a second powder that is different from the first. The tanks 8 and 9 are situated in the top portion of the powder dispenser member 7.

By way of example, the two tanks may contain two different powders, e.g. containing materials that are different and of grain sizes that are identical, or containing identical material with grain sizes that are different, or indeed containing materials that are different with grain sizes that are different.

When the first tank contains a metal alloy and the second tank contains a pure metal, it becomes possible to modify the composition of the alloy by using the pure metal during the fabrication method and depending on requirements.

When the first tank contains a powder of given grain size, and the second tank contains the same powder but with a smaller grain size, it becomes possible to control the density of the resulting part by varying the quantity of powder coming from the second tank. Specifically, by adding more powder from the second tank, in which the grains are smaller, the density of the part is increased.

When the first tank contains a powder of a first material and the second tank contains a powder of a second material that is different from the first but chemically compatible therewith, it becomes possible to make a part having two materials with a composition gradient between the two materials (or in other words, a "soft" transition between the two materials). This enables the reliability and the strength of the part to be increased.

Each of the tanks 8 and 9 has a powder dispenser valve 8a, 9a at its bottom end. In this example, these powder dispenser valves 8a, 9a are in communication with a mixer chamber 10 in the form of a cavity housed in a bottom portion of the powder dispenser member 7. As a result, the tanks 8 and 9 in this example are situated above the mixer chamber 10. In this example, the valves 8a and 9a are distinct such that the powder contained in each of the tanks 8 and 9 is dispensed in independent manner. In the example shown, the powders are caused to flow from the tanks 8, 9 to the mixer chamber 10 of the dispenser member 7, and the powder mixture is caused to flow from the mixer chamber 10 to the stationary platen 2 under the effect of gravity.

By way of example, the mixer chamber 10 may present a volume that lies preferably in the range 0.5 cubic centimeters ($cm^3$) to 10 $cm^3$, or indeed in the range 0.5 $cm^3$ to 100 $cm^3$, so as to be capable of storing the quantity of powder needed for making a layer of powder on the support 5. Naturally, the volume of the mixer chamber should be adapted to its use, and in particular to the area of the support 5 and to the thickness intended for the layers.

The powder dispenser member 7 also has monitor means for monitoring the quantity of powder delivered by the dispenser valves 8a and 9a. In the example shown, these means are in the form of scales 8b, 9b that are suitable for weighing the powder, and that are situated by way of example under the corresponding powder dispenser valves 8a and 9a. These scales 8b and 9b may be connected to a servo-control system 15 (FIG. 3) for controlling the corresponding powder dispenser valves 8a and 9a, in order to monitor accurately and automatically the quantities of powder delivered by each of the valves.

Figure 3:
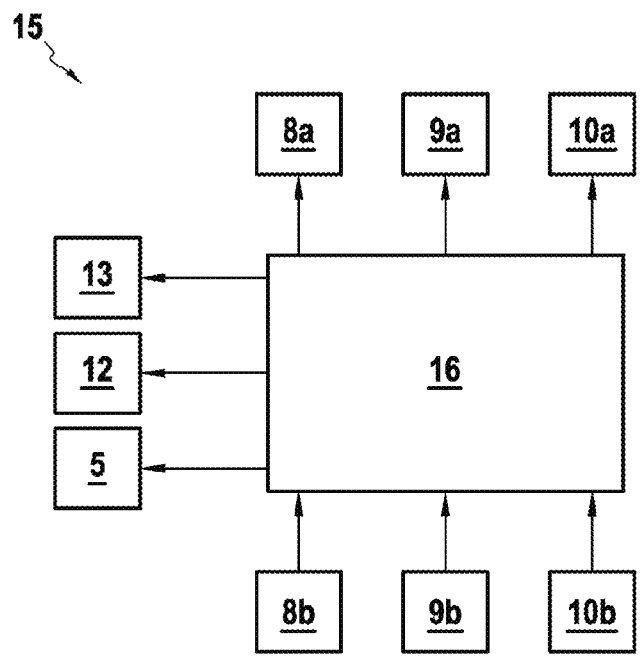
FIG. 3 is a diagram of a servo-control system for a device of the invention.

In this example, the mixer chamber 10 is substantially conical in shape and it is also provided with a powder dispenser valve 10a situated at its bottom end. The powder dispenser member 7 is positioned in such a manner that the valve 10a of the mixer chamber 10 is located above the stationary platen 2. Furthermore, in the example shown, the stationary platen 2 includes scales 10b suitable for weighing the powder delivered by the valve 10b, making it possible, as above, for the valve 10a to be servo-controlled by a servo-control system 15 (FIG. 3).

By way of example, the powder dispenser valves 8a, 9a, and 10a may be driven by a piezoelectric actuator or by a hydraulic actuator. The scales 8b, 9b, and 10b may be electronic scales, preferably presenting sensitivity of 0.1 grams (g), more preferably sensitivity of 0.01 g, or still more preferably sensitivity of 0.001 g.

The mixer chamber 10 also has means for mixing the powder particles that it contains. In the example shown in FIG. 1, these means comprise an inlet orifice 11a and an outlet orifice 11b for a gas stream, which orifices open out into the mixer chamber 10. A gas is to enter into the chamber 10 via the inlet orifice 11a, to flow inside the chamber in order to mix the powders together, and then to exit the chamber via the outlet orifice 11b. The outlet orifice 11b may include a protective cover 11c so as to prevent powder from escaping from the mixer chamber 10 via the outlet orifice 11b. It should be observed that there may be a plurality of inlet and outlet orifices 11a and 11b, in particular for the purpose of controlling the path followed by the gas stream inside the mixer chamber.

Figure 2:
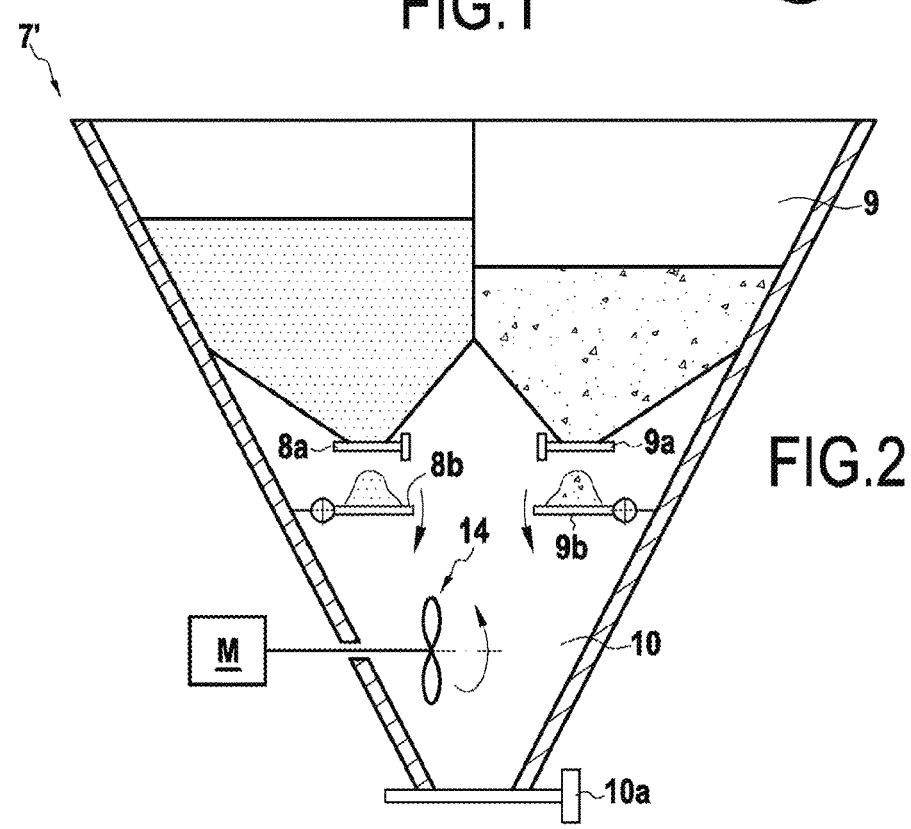
FIG. 2 shows a powder dispenser member of a device in another embodiment of the invention.

The means for mixing powder particles contained in the mixer chamber 10 may also be mechanical, e.g. consisting in a mixer or an agitator 14 driven by an electric motor M, as in the powder dispenser member 7' shown in FIG. 2. It is also possible to envisage using a combination of the above-described means for mixing powder particles within a single device.

In the examples shown in the figures, the powder dispenser member 7, 7' is stationary, as is the mixer chamber 10, which is permanently situated under the powder tanks 8, 9. It should be observed that the invention is not limited to stationary tanks 8, 9 or to a stationary mixer chamber 10, and that these elements could be movable in the device 1. In other words, the mixer chamber 10 may be selectively in communication with the valves 8a, 9a, and may move to recover in succession powder from one tank and then powder from the other tank. In addition, the number of tanks is not limited to two, and it would not go beyond the ambit of the invention to use more than two powder tanks.

The device 1 also has means for spreading powder on the support. In the example shown, these means comprise a roller 12 (or a scraper) that can be moved horizontally from one end of the stationary platen 2 as far as the powder recovery tank 4. The roller 12 may be adjustable in height so as to control the thickness of the layer of powder deposited on the support 5. In an initial position, the roller 12 is situated close to the valve 10a, remote from the support 5, so as to be capable of pushing the powder delivered by the valve 10 and spreading it over the support 5.

In addition, the device 1 has a heater member 13 for melting the powder deposited on the support 5. In the example shown, the heater member comprises a generator portion 13a for generating a laser beam or an electron beam, and a guide portion 13b for guiding the laser beam or the electron beam. With a laser, the guide portion 13b may comprise optical means (e.g. movable mirrors) enabling the laser beam to be moved over the support 5. With an electron beam, the guide portion 13b may comprise coils suitable for deflecting the electron beam.

Finally, the device 1 may be controlled automatically by a servo-control system 15 comprising a controller 16 (FIG. 3) in charge of controlling the support 5, the powder dispenser member 7, 7' (and in particular for servo-controlling the powder dispenser valves 8a, 9a, 10a), and the heater member 13. By way of example, the controller 16 may be configured by an operator to fabricate a part by inputting parameters such as the three-dimensional shape of the part, the thickness of a powder layer, the quantities of the first and second powders in a layer as a function of the particular slice of the part, the operating parameters of the heater member, etc. In particular, the controller 16 may servo-control each valve 8a, 9a, 10a as a function of a setpoint value for a quantity of powder and of the quantity of powder actually delivered by each valve, as measured by way of example by the monitor means 8a, 9b, 10b associated with each valve.

Figure 4:
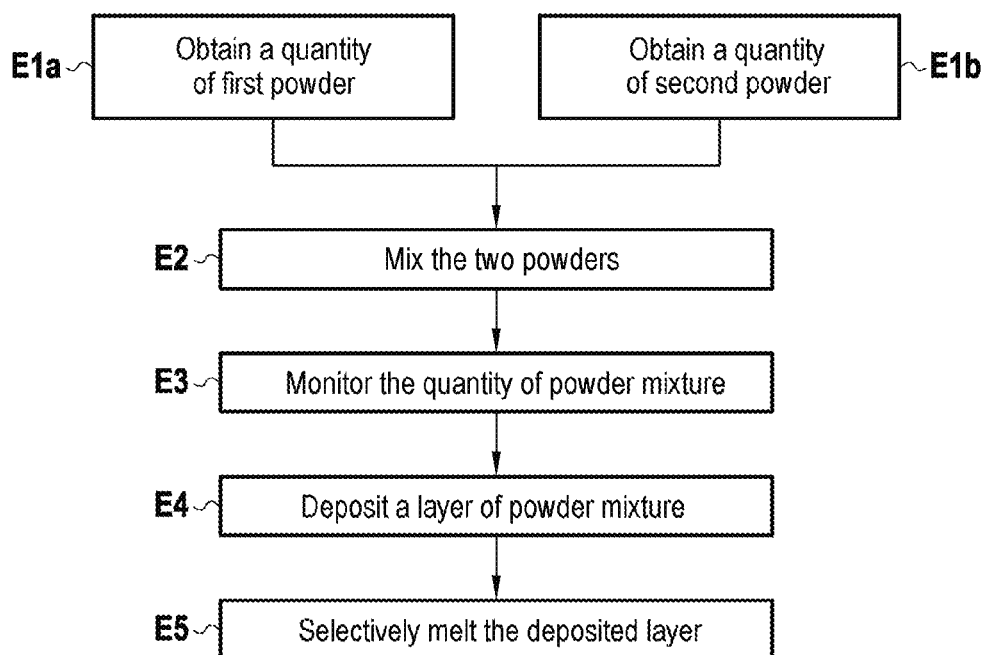
FIG. 4 is a flow chart showing the main steps of a method of the invention.

A method of fabricating a three-dimensional part by selectively melting a powder bed is described below with reference to the flow chart of FIG. 4, and the device of FIG. 1.

In known manner, in a method of fabricating a part by selectively melting a powder bed, a quantity of powder is made available and placed or spread uniformly using means for spreading over the support 5, and then the heater member 13 melts certain portions of the powder layer deposited on the support 5. The above steps are repeated in order to obtain the final part.

In the method of the invention, in order to fabricate one layer of the part, the method begins by obtaining a quantity of a first powder (step E1a). This quantity of first powder may come from a first tank 8, and may be delivered into the mixer chamber 10 using the powder dispenser valve 8a associated with the first tank 8. It is possible to monitor the quantity that is delivered into the chamber 10, e.g. by using scales 8b.

Thereafter, a quantity of a second powder is obtained (step E1b), the second powder being different from the first (e.g. a material that is different or a grain size that is different). By way of example, this quantity of second powder comes from a second tank 9, and is delivered into the mixer chamber 10 using the powder dispenser valve 9a associated with the second tank 9. It is possible to monitor the quantity delivered into the chamber 10, e.g. using scales 9b. Steps E1a and E1b may be performed simultaneously, or in succession.

Once the quantities of the two powders are in the mixer chamber 10, they are mixed together in the chamber 10 (step E2). For example, an inert gas such as argon is caused to flow through the chamber using the gas flow inlet and outlet orifices 11a and 11b for a duration that is long enough to ensure that the mixture is homogeneous. In a variant, it is possible to use mechanical means such as a mixer or an agitator, as described above.

The resulting mixed powder is then poured from the mixer chamber 10 onto the stationary platen 2 by means of the dispenser valve 10a. Scales 10b, optionally present under the valve 10a, serves to monitor the quantity of powder mixture that is delivered (step E3).

Thereafter, the resulting powder mixture is deposited on the support 5 (step E4). To do this, the roller 12 (or some other spreader means) moves towards the support 5, taking with it the powder delivered by the valve 10a. The support 5 is previously lowered through a height corresponding to the thickness desired for the layer. The roller 12 spreads the powder uniformly on the support and takes any surplus powder to the recovery tank 4.

Before the roller 12 returns to its initial position, the heater member 13 is activated so as to melt selectively portions of the powder layer that has been deposited on the support 5 (step E5) so as to form a slice of the part that is to be fabricated.

Finally, the roller 12 returns to its initial position, and the above steps may be repeated for each layer. In order to provide composition gradients within the part, it is advantageous to vary the quantities of the first and/or second powders between two successive layers.

It should be observed that the method of the invention can be used for fabricating just a single portion of a part, with the remainder of the part being fabricated in conventional manner using only one type of powder.

Application examples of a method of the invention are described below for fabricating aviation parts, and in particular a turbine blade (Example 1) and a low-pressure turbine disk (Example 2).

Example 1

Figure 5A:
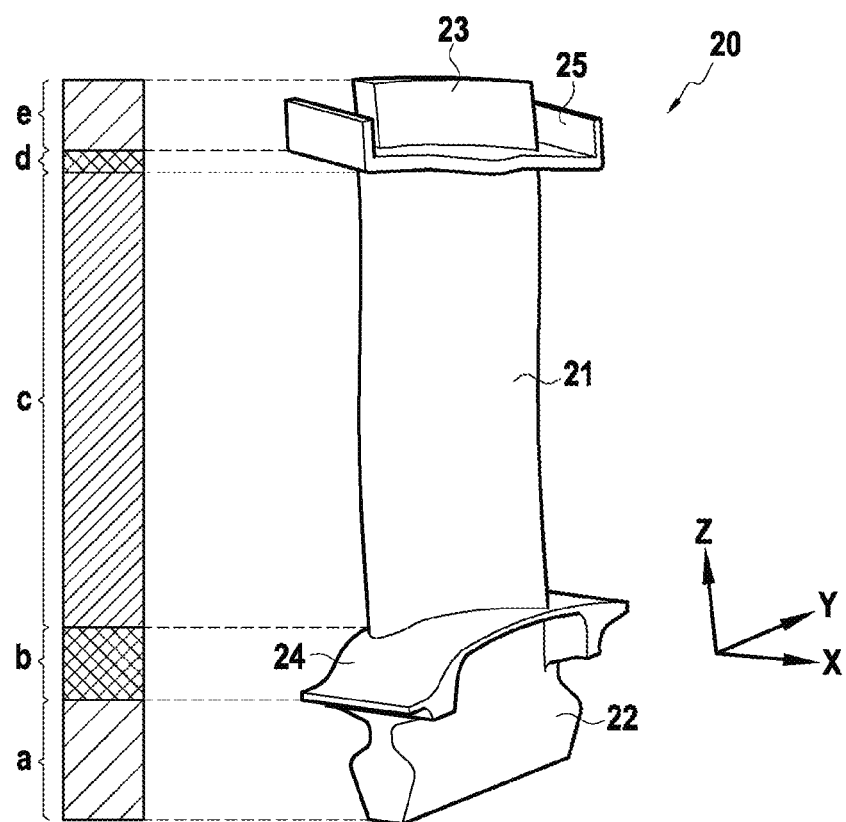
FIGS. 5A to 5C show a first example application of the invention for fabricating a turbine blade.

The idea is to fabricate an aeroengine turbine blade of the kind shown diagrammatically in FIG. 5A.

In known manner, the blade 20 comprises an airfoil 21 that extends between a root 22 and a tip 23. The blade 20 is also provided with a bottom platform 24 and a top platform 25, which between them define a gas stream flow passage.

The blade 20 is mounted on a disk and it is driven in rotation in the turbine engine. In operation, the airfoil 21 is subjected to the conditions imposed by the hot gas, while the root and tip portions 22 and 23 are protected from the stream by the platforms 24 and 25 and are subjected to lower temperatures.

The blade 20 is fabricated layer by layer along the direction Z that corresponds to the longitudinal direction in which the blade 20 extends. Thus, the blade 20 may be divided coarsely into three portions, namely the root 22 with the bottom platform 24, the airfoil 21, and the tip 23 with the top platform 25, which portions are subjected to different environmental conditions. It is therefore possible, using a method of the invention, to envisage fabricating such a blade 20 as a single part by selectively melting a powder bed, while varying the composition of the powder between the different portions of the part, in particular in order to reduce its weight.

Furthermore, the method of the invention makes it possible to create a composition gradient between the various portions so as to provide a "soft" transition of composition between those portions, thereby increasing the reliability of the part.

Various different zones a, b, c, d, and e of the blade 20 are represented diagrammatically by shaded rectangles in FIG. 5A, which zones may have different powder compositions.

Figure 5B:
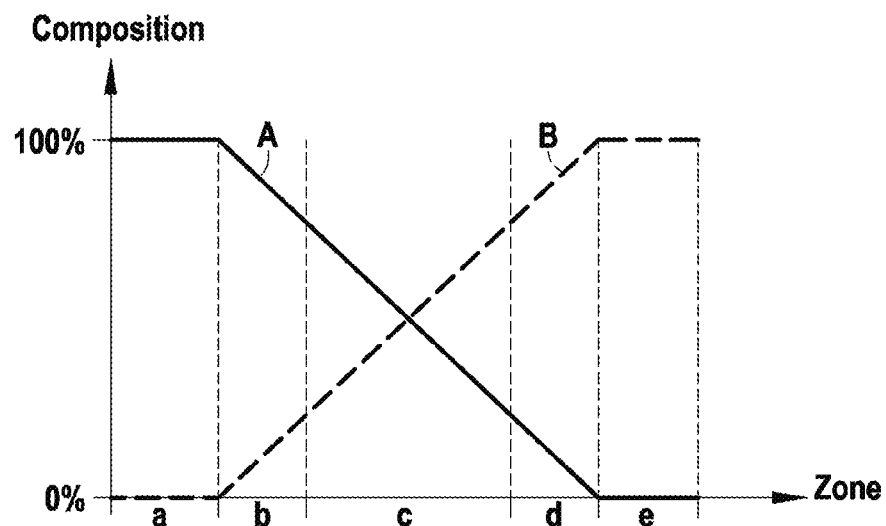

A first example of a layer composition gradient as a function of zones of the blade 20 is shown by the graph in FIG. 5B. This graph shows the composition of a powder A and of a powder B in the blade 20 as a function of blade zones as described below. In this first example, the zone a corresponding to the root of the blade 20 is fabricated using a powder A only. Thereafter, in the zones b, c, and d, corresponding to the platforms 24, 25 and to the airfoil 21, the proportions of powder A and of powder B vary linearly so as to reach a proportion of 100% for the powder B in the zone e that corresponds to the tip 23 of the blade 20.

Figure 5C:
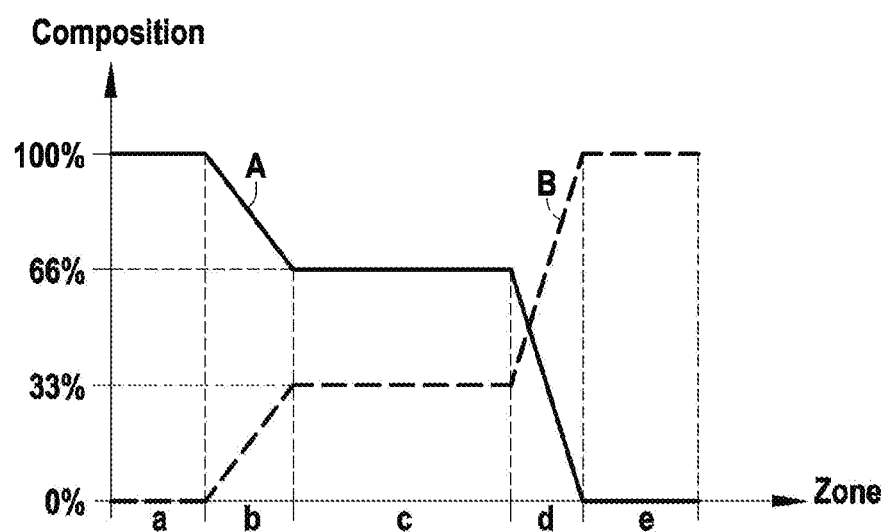

A second example of a composition gradient for the layers as a function of the zones of the blade 20 is shown in the graph of FIG. 5C. The zone a is fabricated initially using only the powder A. The powder composition in the zone c is 66% of powder A and 33% of powder B. The zone b is a zone of linear transition of the composition between the zone a and the zone c. Thereafter, the zone d is a zone of linear transition of the composition between the zone c and the zone e. The proportion of powder B in the zone e is 100%.

In the two composition gradient examples described above with reference to FIGS. 5B and 5C, the powder A may for example comprise an alloy of the Inconel® 718 type having a grain size defined by $d_{90}$ that is less than 50 micrometers (μm), and the powder B may for example comprise an alloy of Hastelloy® X type with $d_{90}$ that is less than 50 μm.

It should be observed that it is equally possible to fabricate other types of blade in the same manner, such as two-material compressor blades, e.g. in which the root of the blade comprises a Ti17 titanium-based alloy, and the airfoil comprises a TA6V titanium-based alloy.

Example 2

This example relates to fabricating a low-pressure turbine disk 30 for an aeroengine, such as that shown diagrammatically in FIG. 6. The disk 30 has fastener holes 31, a flange-forming portion 32 that is subjected to fatigue stress (in particular at the fastener holes 31), and a portion 33 forming a rim that is subjected to creep stress.

In order to provide the part with good creep behavior, it is desired to obtain a microstructure with grains that are larger in size, whereas in order to provide good fatigue behavior, it is preferable to use smaller grains. Specifically, creep deformation takes place because of slip between grain boundaries, so increasing grain size makes it possible to reduce the number of grain boundaries and to reduce their accumulated length. Conversely, in order to reduce crack propagation (and thus improve fatigue behavior), it is desirable to increase the number of grain boundaries by reducing grain size.

The disk 30 is fabricated from melted layers of powder that are stacked by way of example along an axis Y, the portion 32 being fabricated before the portion 33. Thus, by using a method of the invention, it is possible to fabricate such a disk 30 as a single piece by selectively melting a powder bed by varying the composition of the powder between the two portions 32 and 33 so as to optimize the grain structure as a function of the stresses to which the part is to be subjected.

Furthermore, the method of the invention makes it possible to create a gradient between the grain structures of the portions 32 and 33 so as to provide a soft transition of properties between those portions, thereby increasing the reliability of the part.

Figure 6A:
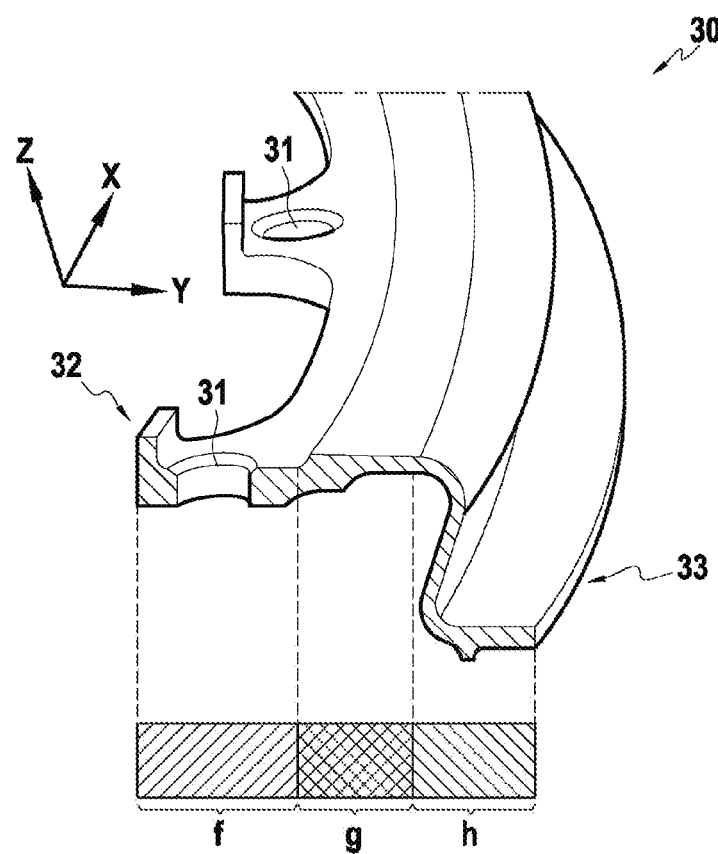
FIGS. 6A and 6B show a second example application of the invention for fabricating a low-pressure turbine disk.

In FIG. 6A, shaded rectangles are used to represent the various zones f, g, and h of the part diagrammatically, which zones may have different powder compositions. The zone f corresponds substantially to the flange-forming portion 32, the zone h corresponds to the rim-forming portion 33, and the zone g is the intermediate zone between the portions 32 and 33 of the disk 30.

Figure 6B:
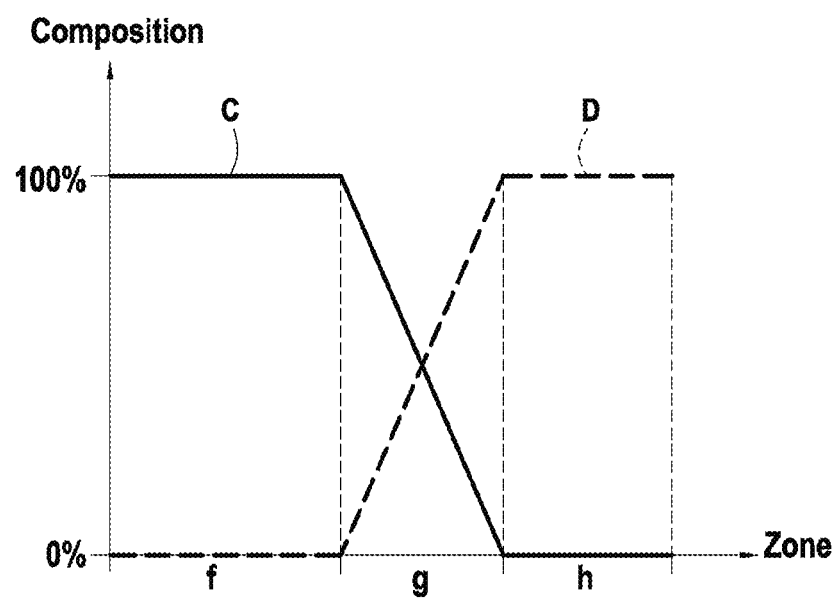

FIG. 6B is a graph showing an example of how the composition of two powders C and D may vary in the disk 30 as a function of the disk under consideration. The zone f is fabricated from the powder C only and the zone h is fabricated from the powder D only. The intermediate zone g is a zone of linear transition of the composition between the zones f and g. Care is thus taken to ensure that the powder C forms grains that are finer than the powder D.

The table below gives three examples CD1, CD2, and CD3 of pairs of metal alloy powders C and D suitable for use in fabricating a disk 30 by a method of the invention, and having mechanical properties of withstanding fatigue and creep that are optimized depending on the zone of the part.

|  | Powder C | Powder D |
|---|---|---|
| CD1 | Inconel ® 718/$d_{90}$ ≤ 50 μm | Inconel ® 718/$d_{90}$ ≤ 150 μm |
| CD2 | Inconel ® 718/$d_{90}$ ≤ 50 μm | Udimet ® 730/$d_{90}$ ≤ 50 μm |
| CD3 | Inconel ® 718/$d_{90}$ ≤ 50 μm | Udimet ® 720/$d_{90}$ ≤ 150 μm |

The invention claimed is:

1. A device for fabricating a three-dimensional part by selectively melting a powder bed, the device comprising:
   a first tank containing a first powder, said first tank being provided with a first powder dispenser valve;
   at least one second tank containing a second powder different from the first powder, said second tank being provided with a second powder dispenser valve;
   a first monitoring device for monitoring the quantity of first powder delivered by the first valve;
   a second monitoring device for monitoring the quantity of second powder delivered by the second valve;
   a mixer chamber in communication with the first and second valves, said mixer chamber including a third powder dispenser valve, and a mixing device for mixing the powder particles contained in said mixer chamber;
   a support for receiving the powder delivered by the third valve and on which the part is to be fabricated;
   a powder spreader for spreading powder on the support; and
   a heater member for locally melting the powder spread on the support;
   wherein the first powder presents a first grain size and the second powder presents a second grain size, the first grain size being different from the second grain size,
   wherein the mixing device for mixing the powder particles contained in the mixer chamber comprises an inlet orifice and an outlet orifice for a gas stream inside the mixer chamber, said gas stream inlet and outlet orifices being configured to cause a gas to flow in the mixer chamber so as to mix the powder contained in said mixer chamber, and
   wherein the outlet orifice has a protection cover configured to prevent powder from escaping from the mixer chamber via said outlet orifice.

2. A device according to claim 1, wherein the first and second powders are made of the same material.

3. A device according to claim 1, wherein the first and second powders are made of materials that are different.

4. A device according to claim 3, wherein the first powder is constituted by a first material and the second powder is constituted by a second material, the first and second materials being chemically compatible.

5. A device according to claim 3, wherein the first powder is constituted by a metal alloy and the second powder is constituted by a pure metal.

6. A device according to claim 1, further comprising a third monitoring device for monitoring the quantity of powder or powder mixture delivered by the third valve.

7. A device according to claim 2, wherein the first and second monitoring devices for monitoring the quantity of powder comprise scales for weighing the powder.

8. A device according to claim 1, further comprising a servo-control system for controlling at least one valve for dispensing powder or a powder mixture as a function of the quantity of powder or powder mixture delivered by said at least one valve.

9. A device according to claim 1, wherein at least one of the first powder dispenser valve, the second powder dispenser valve or the third powder dispenser valve is driven by a piezoelectric actuator or a hydraulic actuator.

10. A device according to claim 1, wherein the heater member comprises a laser or an electron beam generator.

11. A device according to claim 1, wherein the first and second powder tanks are situated above the mixer chamber.

12. A device according to claim 1, wherein the first tank, the second tank, and the mixer chamber are stationary.

13. A device according to claim 1, wherein the mixer chamber is movable and configured to recover powder in succession from one of the first and second tanks, and then from the other of the first and second tanks.

\* \* \* \* \*